UNITED STATES PATENT OFFICE.

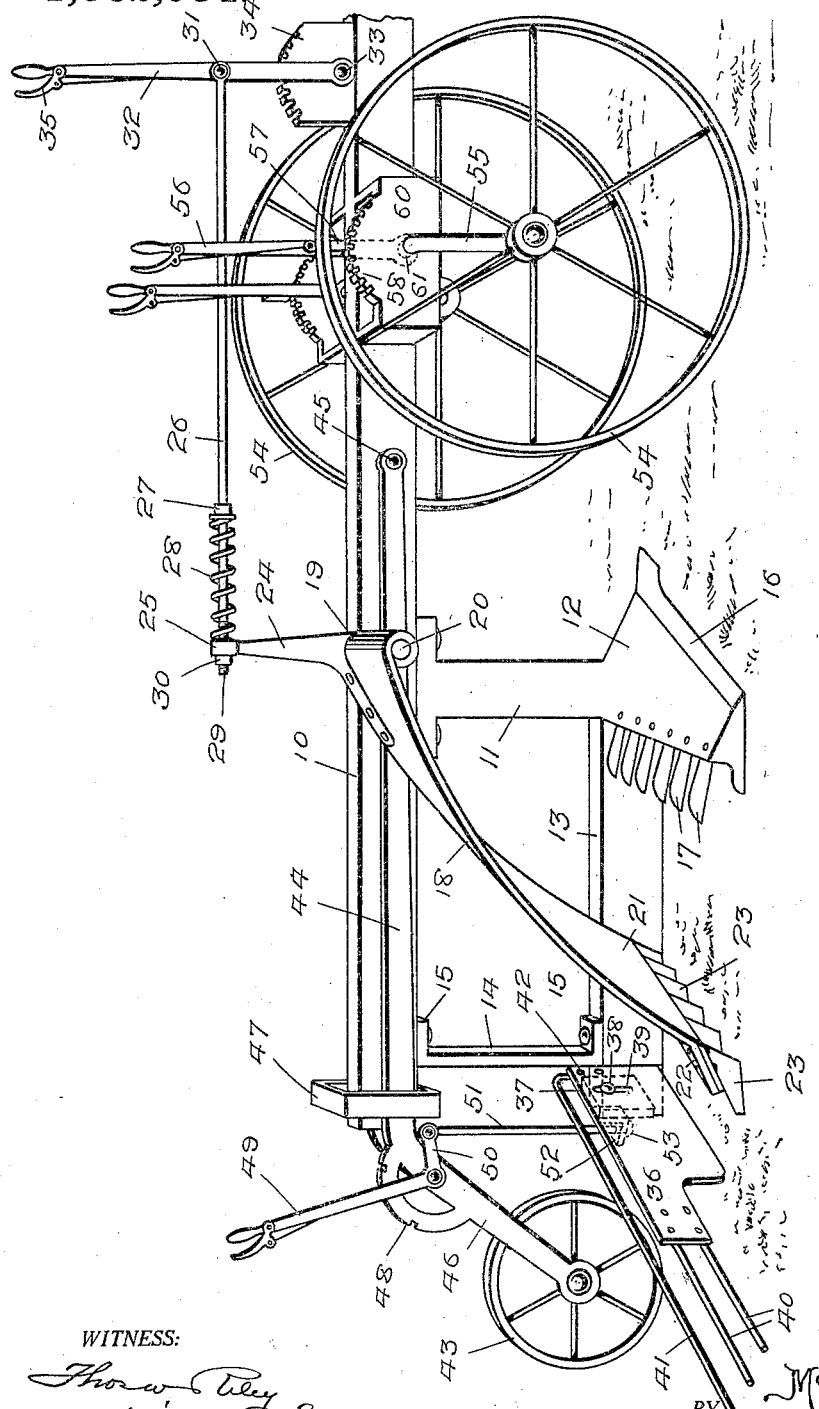

MORGAN C. FRENCH, OF CRAIG, COLORADO.

BRUSH-PLOW.

1,362,934. Specification of Letters Patent. Patented Dec. 21, 1920.

Application filed November 21, 1918. Serial No. 263,615.

*To all whom it may concern:*

Be it known that I, MORGAN C. FRENCH, a citizen of the United States, residing at Craig, in the county of Moffat and State of Colorado, have invented certain new and useful Improvements in Brush-Plows; and I do hereby declare the following to be a full, clear, and exact description of the invention, such as will enable others skilled in the art to which it appertains to make and use the same.

This invention relates to a brush plow and particularly to improvements in the construction shown in my prior Patents No. 1,153,213 of September 14, 1915, and No. 1,184,847 of May 30, 1916.

The invention has for an object to provide a novel and improved construction of such plow embodying a shield extended at the rear of the mold-board and carrying at its lower end a series of cutter blades disposed to break up the earth and separate it from brush and roots, said shield being yieldingly and adjustably mounted.

A further object of the invention is to provide at the rear of the mold-board a scraper adapted for vertical adjustment and provided with extended rods to expel the brush at an angle from the plow.

Other and further objects and advantages of the invention will be hereinafter set forth and the novel features thereof defined by the appended claims.

The drawing represents a perspective of the invention applied to a plow.

The numeral 10 indicates the plow beam which may be of any desired construction and has secured thereto at its underface the usual standard 11 provided at its lower portion with the mold-board 12. Extending rearwardly from this standard is the land side 13 which is connected with the beam 10 by means of a brace 14 having angular end portions 15 bolted or otherwise secured to the beam and land side. The mold-board is provided with the usual plow share 16, its cutting edge being disposed at substantially an obtuse angle to the standard 11, while the rear of this mold-board has applied thereto a series of detachably mounted cutter blades 17 spaced from each other and over which the soil from the mold-board travels and is broken by contact therewith.

Extending from above the mold-board and plow share and to the rear thereof is a shield 18 which is pivotally mounted at its upper end 19 upon a stud or projection 20 extending from the beam 10 at a right angle thereto. The lower portion of this shield is turned or twisted at an angle to its pivotal portion so that the depending end 21 of the shield lies at substantially an obtuse angle to the beam and also to the pivot of the plow. This results in placing the lower end of the shield in a plane substantially parallel with that of the plow share 16. The end 21 of the shield is provided with an angularly disposed portion 22 to which a series of cutter blades 23 are detachably secured and spaced from each other. This shield is mounted for adjustment and for yielding movement when contacting with stones or other solid matter by means of an angle arm 24 extending upward from its pivot and provided with an eye 25 slidingly mounted upon the adjusting rod 26. This rod also carries a stop 27, and between this stop and the eye 25 a compression spring 28 extends. The end of the rod 26 is threaded, as at 29, and an adjusting nut 30 applied thereto by which the tension of the spring may be regulated. The rod 26 at its forward end is pivotedly connected at 31 to the adjusting lever 32 which is pivoted at its lower portion 33 upon the body of the sector 34. This lever may be held in adjusted position by any ordinary form of latch mechanism, as indicated at 35.

At the rear of the shield 18 a scraper 36 is mounted and acts to remove the soil so as to leave a clean furrow. This scraper is mounted upon an angular projection 37 extending from the land side 13 and may be adjusted vertically thereon by means of the retaining bolt 38 mounted in the portion 37 and operating within a slot 39 in the scraper blade 36. This blade is also provided with parallel brush rods 40 secured thereto and extending from the free edge of the blade while a supplemental rod 41 of this character extends above the blade and is secured thereto at its inner end 42.

At the rear of the plow a supporting wheel 43 is provided and is carried by an arm 44 pivotally mounted at 45 upon the beam 10 and having an angular depending portion 46 upon which the wheel 43 is pivoted. The arms 44 may be duplicated upon opposite sides of the beam so as to embrace the wheel 43 in the usual manner. The movement of this arm 44 is guided and limited by means of a keeper 47 secured to the under face of the beam and spaced from the sides thereof so as to secure movement of the arm in parallelism with the beam and also limit its upward travel. The depending portion 46 of the arm 44 is provided with a sector 48 adapted to coöperate with a latch lever 49 having at its lower end a crank arm 50 from which a rod 51 extends downward and through a socket plate 52 secured at the rear of the land side 13. This rod is provided with an enlarged head beneath the socket plate so as to be free for downward movement therethrough but to engage this plate and support the land side from the wheel 43. This permits a free movement of the parts while plowing so that the plow may adjust itself to inequalities in the ground and also permits the plow to be raised and retained while being moved from place to place and out of operative position.

The forward end of the plow beam is provided with the usual traction wheels 54 each mounted upon a crank axle 55 from which an adjusting lever 56 extends. These adjusting levers are similar in construction and each provided with a retaining latch 57 adapted to engage a sector 58 carried by a frame 60 secured to the beam. It will be understood that the end of the crank axle 55 is pivoted in this frame 60 in the usual manner as indicated at 61.

It is believed that the construction and operation of this invention will be apparent from the foregoing description from which it will be seen that the soil as raised by the mold-board is broken up or partially pulverized in its passage over the cutting blades carried thereby and then engages the shield at its lower portion by which it is forcibly drawn into contact with the cutter blades carried at the lower end thereof. These blades operating upon a line at an obtuse angle to the beam cause the brush, trash or loose material to be thrown outward and the soil or clods broken up and thoroughly pulverized so as to secure an effective separation from the roots and brush material. The scraper coöperating with these blades removes such material from the soil leaving a clean furrow and this scraper being disposed at a similar obtuse angle to the beam causes the loose brush to travel outward and be deposited upon the top of the ground. It will be noted that the particular construction of the shield which disposes its lower end at an obtuse angle to its pivot produces an effective side delivery to expel brush therefrom and also produce the most efficient cutting action by the angle at which the blades are disposed. The mounting for this shield causes it to absorb shocks from contact with clods, rocks or other material as it is allowed to rise and is immediately restored to position, while the material which passes thereunder is caught and removed by the scraper at the rear without damage or stoppage. The mounting of the shield is also such as to permit it to be raised in dumping position or disposed at any desired angle relative to the mold-board and plow share. The invention presents a simple, efficient and economically manufactured construction of plow particularly adapted for use upon sage brush and new land where much undergrowth is encountered and should be separated from the soil in such position that it may be readily raked for other disposal.

While I have described a specific construction of the several parts, still the invention is not confined thereto as changes may be made therein within the scope of the following claims.

What I claim is:

1. In a brush plow, a beam provided with a plow share and a shield extending rearwardly behind said plow share from above same and provided at its lower edge with a series of cutter blades.

2. In a brush plow, a beam provided with a plow share, a shield extending rearwardly behind said plow share and provided at its lower edge with a series of cutter blades, and a scraper extending laterally from the beam and disposed at the rear of said shield.

3. In a brush plow, a beam provided with a plow share, a shield extending rearwardly behind said plow share and provided at its lower edge with a series of cutter blades, a scraper extending laterally from the beam and disposed at the rear of said shield, and brush rods extending from said scraper.

4. In a brush plow, a beam provided with a plow share at one side, a shield at said side of the beam extending rearwardly behind said plow share from above same and provided at its lower edge with a series of cutter blades, and means to permit a yielding movement of said shield toward and from said plow share.

5. In a brush plow, a beam provided with a plow share, a series of cutter blades extending rearwardly therefrom, a shield pivotally mounted above said share and extended to the rear thereof with its free edge disposed at an obtuse angle to said beam, and a series of cutter blades carried by said shield.

6. In a brush plow, a beam provided with a plow share, a series of cutter blades extending rearwardly therefrom, a shield pivotally mounted above said share and extended to the rear thereof with its free edge disposed at an obtuse angle to said beam, a series of cutter blades carried by said shield, a lever arm extended from said shield, and tension means to yieldingly retain said arm.

7. In a brush plow, a beam provided with a plow share, a series of cutter blades extending rearwardly therefrom, a shield pivotally mounted above said share and extended to the rear thereof with its free edge disposed at an obtuse angle to said beam, a series of cutter blades carried by said shield, a lever arm extended from said shield, a rod extending through said arm, a stop carried by said rod, a spring disposed between said arm and stop, and a latch lever carried by the opposite end of said rod.

8. In a brush plow, a beam provided with a plow share, a series of cutter blades extending rearwardly therefrom, a shield pivotally mounted above said share and extended to the rear thereof with its free edge disposed at an obtuse angle to said beam, a series of cutter blades carried by said shield, a lever arm extended from said shield, a rod extending through said arm, a stop carried by said rod, a spring disposed between said arm and stop, a latch lever carried by the opposite end of said rod, and means upon said rod for adjusting the tension of said spring.

9. In a brush plow, a share having cutter blades extending rearwardly therefrom, a shield extending from above the share rearwardly and downwardly in rear of the share and yieldable upwardly, and downwardly extending cutter blades carried by the lower edge of the shield.

10. In a brush plow, a land side, a share extending therefrom at its forward end, a scraper extending from the land side near its rear end, and a downwardly extending shield between the share and scraper and having cutter blades.

11. In a brush plow, a beam provided with a plow share, a pivot extending at a right angle from said beam, a shield mounted upon said pivot and having its lower free edge disposed at an obtuse angle to its pivot, and cutter blades carried by the lower edge of said shield.

12. In a brush plow, a beam provided with a plow share, a pivot extending at a right angle from said beam, a shield mounted upon said pivot and having its lower free edge disposed at an obtuse angle to its pivot, cutter blades carried by the lower edge of said shield, and a scraper blade disposed at an obtuse angle to said beam and substantially parallel to the lower edge of said shield.

13. In a brush plow, a share, a shield pivotally mounted above the share and extending rearwardly and downwardly, and cutter blades carried by the shield and extending downwardly in rear of the share.

In testimony whereof I have signed my name to this specification.

MORGAN C. FRENCH.